(12) United States Patent
Stoeffler et al.

(10) Patent No.: US 8,744,190 B2
(45) Date of Patent: Jun. 3, 2014

(54) SYSTEM AND METHOD FOR EFFICIENT IMAGE FEATURE EXTRACTION

(75) Inventors: Norbert Stoeffler, Grafelfing (DE);
Martin Raubuch, Baldham (DE)

(73) Assignee: Freescale Semiconductor, Inc., Austin, TX (US)

( * ) Notice: Subject to any disclaimer, the term of this patent is extended or adjusted under 35 U.S.C. 154(b) by 317 days.

(21) Appl. No.: 13/140,025

(22) PCT Filed: Jan. 5, 2009

(86) PCT No.: PCT/IB2009/050012
§ 371 (c)(1),
(2), (4) Date: Jun. 16, 2011

(87) PCT Pub. No.: WO2010/076668
PCT Pub. Date: Jul. 8, 2010

(65) Prior Publication Data
US 2011/0249869 A1      Oct. 13, 2011

(51) Int. Cl.
*G06K 9/46*       (2006.01)
*G06K 9/66*       (2006.01)

(52) U.S. Cl.
USPC .......................... 382/190; 382/103; 382/156

(58) Field of Classification Search
USPC .......................................... 382/103, 156, 190
See application file for complete search history.

(56) References Cited

U.S. PATENT DOCUMENTS

| | | | |
|---|---|---|---|
| 7,113,620 B2 * | 9/2006 | Shiotani | 382/112 |
| 7,162,073 B1 | 1/2007 | Akgul et al. | |
| 7,840,062 B2 * | 11/2010 | Boroczky et al. | 382/159 |
| 2007/0248249 A1 * | 10/2007 | Stoianov | 382/124 |
| 2007/0288410 A1 * | 12/2007 | Tomkins et al. | 706/42 |
| 2008/0317345 A1 * | 12/2008 | Wiedemann et al. | 382/181 |
| 2011/0249869 A1 * | 10/2011 | Stoeffler et al. | 382/104 |

FOREIGN PATENT DOCUMENTS

| | | |
|---|---|---|
| EP | 1394726 A | 3/2004 |
| WO | 2006/132720 A2 | 12/2006 |

OTHER PUBLICATIONS

M. Yagi, T. Shibata: "An Associative-Processor-Based Mixed Signal System for Robust Grayscale Image Recognition" International Symposium on Circuits and Systems, vol. 5, May 26, 2002-May 29, 2002, pp. 137-140.

Almudena Lindoso and Luis Entrena: "High Performance FPGA-Based Image Correlation" Journal of Real-Time Image Processing, vol. 2, No. 4, Dec. 4, 2007, pp. 223-233.

(Continued)

*Primary Examiner* — Gregory M Desire (57) ABSTRACT

A system for efficient image feature extraction comprises a buffer for storing a slice of at least n lines of gradient direction pixel values of a directional gradient image. The buffer has an input for receiving the first plurality n of lines and an output for providing a second plurality m of columns of gradient direction pixel values of the slice to an input of a score network, which comprises comparators for comparing the gradient direction pixel values of the second plurality of columns with corresponding reference values of a reference directional gradient pattern of a shape and adders for providing partial scores depending on output values of the comparators to score network outputs which are coupled to corresponding inputs of an accumulation network having an output for providing a final score depending on the partial scores.

20 Claims, 6 Drawing Sheets

(56) References Cited

OTHER PUBLICATIONS

Ceccarelli M et al: "The Orientation Matching Approach to Circular Object Detection" Proceedings 2001 International Conference on Image Processing, ICIP 2001, Thessaloniki, Greece, Oct. 7-10, 2001; [International Conference on Image Processing], New York, NY: IEEE, US, vol. 3, Oct. 7, 2001, pp. 712-715.

Steven W. Smith: "Digital Signal Processing: A Practical Guide for Engineers and Scientists" [Online] 2003.

Kimme C et al: "Finding Circles by an Array of Accumulators" Communications of the Association for Computing Machinery, ACM, New York, NY, US, vol. 18, No. 2, Feb. 1, 1975, pp. 120-122.

Haralick Robert M. et al: "Computer and Robot Vision" Version 1, Addison-Wesley Longman Publishing Co., Inc. Boston, MA, USA 1992, ISBN: 0201569434.

International Search Report and Written Opinion correlating to PCT/IB2009/050012 dated Oct. 5, 2009.

\* cited by examiner

SYSTEM AND METHOD FOR EFFICIENT IMAGE FEATURE EXTRACTION

FIELD OF THE INVENTION

This invention in general relates to digital image processing and more specifically to a system and a method for image feature extraction.

BACKGROUND OF THE INVENTION

Many applications employing image processing typically rely on the evaluation of information about the content of a digital image or video. In order to provide these information, many techniques for automatically extracting information about the content have been developed. A common problem is to find primitive shapes, for example lines, circles, ellipses or curves in an image frame. For example, many Advanced Driver Assistance Systems (ADAS), i.e. systems for supporting the driver of a vehicle for increased driving safety, for example systems for lane departure warning, collision warning, automatic parking or traffic sign recognition, require reliable and fast detection of shapes, such as lines or circles. The detection of eyes is another example application for shape detection in digital image frames, for example in portraits or for systems for detection of vehicle driver drowsiness.

Due to the amount of image data and the unknown variety of information contained, the data may be difficult to be processed. One approach of reduction is feature extraction, i.e. a transformation of the image data into a reduced representation set of features. The features extracted should contain the relevant information from the input data to perform the desired task, for example to detect a shape such as a line or a circle based on this reduced representation instead of the original data.

An example of a feature extraction technique is the Hough transform. The algorithm for computing the Hough transform comprises a voting procedure carried out in a parameter space, from which object candidates are obtained as local maxima.

The Hough transform for circles (HTFC) is a method for detecting circle shapes in a digital image and may therefore for example be applied when detecting eyes in portrait images or traffic signs in video-based driver assistance systems.

For HTFC, a pre-processing step is required for a digital gray-value input image $I(x,y)$, wherein the gradient of the image intensity function is calculated for each pixel (picture element) and the image $I(x,y)$ is replaced by a directional gradient image containing gradient vectors $g(x,y)$. Gradients may be calculated using two-dimensional gradient filter operators.

The first step of the HTFC itself is the generation of 2-dimensional histograms of circle-center probability scores. Typically, one histogram has to be generated for every radius of interest.

For a single radius r, the following applies: As the gradient g points towards the center of the circle (or to the opposite direction), at every pixel position x,y the histogram entries at $(x,y)+r\cdot g/|g|$ and $(x,y)-r\cdot g/|g|$ are increased, i.e. for HTFC every gradient direction pixel value votes for two circle centers. If the values belong to a circle, scores at the center may accumulate and the maxima in the histogram designate circle centers. In a second step, this histogram is searched for the maximum entries.

The implementation of the Hough transform and especially the HTFC typically requires a lot of buffer-space, since each calculated two-dimensional histogram usually has the same dimensions as the image. For HTFC, one 2D histogram per circle diameter is required. The calculation of the HTFC for an image frame may require considerable processing time, since the sequential read-modify-write accesses may limit the speed of operation.

Usually, the processing of a complete image frame is performed in two passes. The effect of a single input pixel to a $2r \times 2r$ region of the histogram is rendered. The histogram entries reach their final value when all relevant pixels have been processed. After the histogram calculation is finished the maxima in the histogram have to be searched in a second pass.

SUMMARY OF THE INVENTION

The present invention provides a system and a method for efficient image feature extraction as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Identical reference numerals in different figures refer to identical or similar components.

DETAILED DESCRIPTION OF THE PREFERRED EMBODIMENTS

Figure 1:
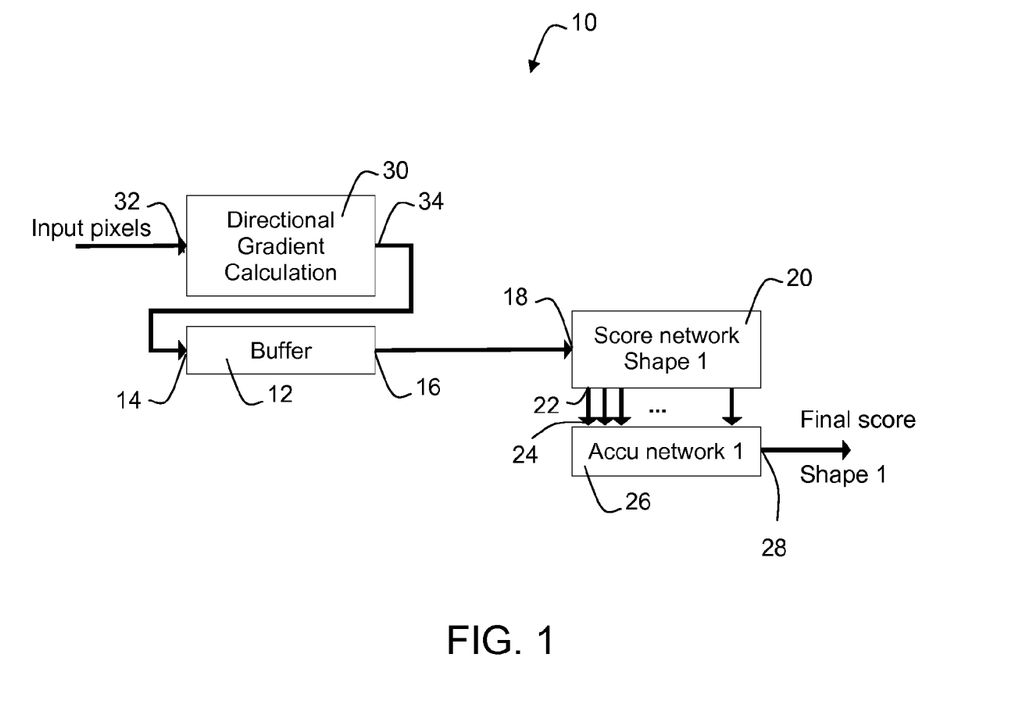
FIG. 1 shows a schematic block diagram of an example of a first embodiment of a system for efficient image feature extraction.

Referring to FIG. 1, a schematic block diagram of an example of a first embodiment of a system 10 for efficient image feature extraction is shown. The system comprises a buffer 12 for storing a slice of at least a first plurality n of lines of gradient direction pixel values of a directional gradient image. The buffer has a buffer input 14 for receiving the first plurality n of lines and a buffer output 16 for providing a second plurality m of columns of gradient direction pixel values of the slice to a score network input 18 of a score network 20. The score network comprises a plurality of comparators for comparing the gradient direction pixel values of the second plurality of columns with corresponding reference gradient direction pixel values of a reference directional gradient pattern of a shape and a plurality of adders for providing partial score values depending on output values of the comparators to one or more score network outputs 22. The one or more score network outputs are coupled to one or more corresponding accumulation network inputs 24 of an accumulation network 26 having an accumulation network output 28 for providing a final score value depending on the partial score values.

The number of lines of the reference directional gradient pattern may be n, therefore corresponding to the number of lines of the slice, i.e. the number of gradient direction pixel values in a column of the slice sent to the score network. A number d of columns of the reference directional gradient pattern may be up to m. However, usually the number d will be smaller, for example n in order to apply a square reference pattern.

The reference pattern comprises the gradient direction pixel values of a shape. Hence, the calculated final score is an indicator of similarity between the shape and the input image pixels corresponding to the directional gradient pixel values sent to the score network.

In one embodiment of the system, a number d of columns may be applied to the score network, each of the d×n gradient direction pixel values may be compared to the corresponding of the d×n reference gradient direction pixel values. If the result of a comparison shows that corresponding values of a pair are identical, a partial score value may be increased. Typically, lines or columns of values may be compared, and a partial score may be calculated for each line or column, for example by counting the number of comparison results corresponding to identical compared values.

A gradient direction pixel value of a set of values of d columns and n lines sent to the score network may be said to be corresponding to its reference gradient direction pixel value, if they share the same position in said set and in the reference directional gradient pattern having d columns and n lines.

The partial score values may be provided to the accumulation network 26. In the described embodiment the accumulation network may accumulate all partial scores to a final score value, for example by adding the partial score values, therefore providing a matching score for the part of the directional gradient image sent to the score network and the reference directional gradient pattern. Each final score value may therefore be regarded as a histogram entry of a Hough transform of the input image for the reference shape for the input image position corresponding to the gradient direction pixel values currently applied to the score network 20. Therefore, this image feature extraction system 10 may be used for calculating a Hough transform with respect to the chosen shape, for example a HTFC.

In order to provide final score values for a line of m gradient direction pixel values, all possible sets of d columns differing from all other sets by one line may be sent to the score network. For processing a complete image, the slice may be processed, the first line may be removed from the buffered slice and the next line of the directional gradient image being processed may be added to the buffered slice. Although any kind of buffer may be used, for efficient implementation, the buffer 12 may be a ringbuffer. And the buffer 12 may allow for storing at least one additional line of gradient direction pixel values. Hence, a new line may be inserted in the buffer while processing the slice.

The system 10 may repeat this procedure until all lines of the image have been processed. When using the system in a digital video based application, all or a part of the image frames of a video sequence may be processed.

For performing the required pre-processing of a digital image and providing the required directional gradient representation of a digital input image, the system 10 may comprise a gradient direction calculation module 30 having a module input 32 for receiving input pixels of an input image and a module output 34 for providing the gradient direction pixel values of the directional gradient image calculated from the input image to the buffer input 14.

The score network 20 provides the partial score values. The score network 20 may provide partial score values for columns of compared values. A partial score value may for example be the sum of all gradient direction pixel values of a column found to be identical to the corresponding reference values of the reference pattern. Therefore, comparators and adders may be coupled to form a plurality of column comparator networks 36, 38, 40 and each column comparator network may provide one of the partial scores to the accumulation network 26.

Figure 2:
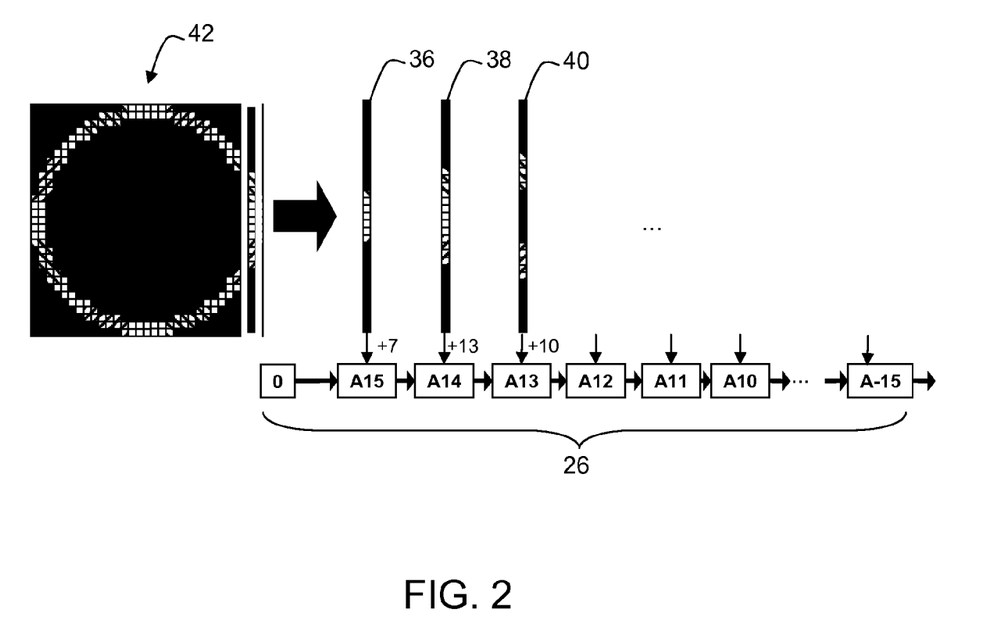
FIG. 2 shows a schematic block diagram of an example of an implementation of a system for efficient image feature extraction using an accumulator chain.

Referring now to FIG. 2, a schematic block diagram of an example of an implementation of a system for efficient image feature extraction using an accumulator chain 26 is shown. The system may be implemented for fast execution by re-ordering the sequence of calculation steps, therefore allowing to render the effects of a column of n gradient vectors or gradient direction pixel values to a row of d histogram entries at once. For circular shapes of radius r as applied in HTFC, the effects of a column of 2r gradient vectors, i.e. gradient direction pixel values, to a row of 2r histogram entries may be rendered at once. For every pixel clock cycle, a column of 2r directions or gradient direction pixel values may be read from the buffer 12. The score network, which in this example may be a logic network with 2r inputs and 2r outputs then may calculate a required update of a row of 2r histogram entries.

For this, the second plurality m of columns of the slice may be applied to the score network 20 consecutively and each column of the second plurality m of columns may be applied in parallel to each of the column comparator networks 36, 38 40, i.e. each column entered in the score network may be applied to all column comparator networks 36, 38, 40 concurrently at the same time. All processing depending on gradient direction pixel values of the column may therefore be performed at once without any need of re-entering the same column in the score network for another processing. Columns may therefore be sent to the score network 20 consecutively, for example in a stream of columns. The system may even be able to process live video.

The score network 20 may be generated a priori depending on the geometry of the shape. As this network may be mostly sparse, it may be efficiently synthesized.

In order to calculate the final score, the accumulation network 26 may comprise a plurality of accumulate-and-shift registers A15, A14, A13, A12, A11, A10, A-15 coupled to form an accumulator chain. An accumulate-and-shift register may receive a first input value, add it to a second input value and provide the result at an output on reception of a shift command, for example by a pixel clock signal.

Each of the accumulate-and-shift registers may be coupled at one of its inputs to a different column comparator network 36, 38, 40 for receiving one of the partial score values, thereby enabling a correlation-like calculation of the final scores corresponding to the d histogram entries of a Hough transform for the shape. The histogram entries may be calculated using a chain of accumulator registers. This chain may be shifted after the partial score column entries have been received. After a setup delay of d shifts the final result, i.e. the final score, pops out of the last accumulator of the chain and may directly be entered into a list of the biggest score values to be searched directly for maximum values indicating highly probable positions of shapes similar to the reference shape in the input image.

The system shown in FIG. 2 shows an example of an accumulator chain comprising 31 accumulators corresponding to a directional gradient pattern having 31 columns. In the example shown in FIG. 2, the input image may contain a perfect circle. For example, a first input column to the score network for a shape of a perfect circle having a diameter of 31 pixels may be 15 pixels away from the circle center and a comparison may result in a partial score of 7 to be added to the corresponding accumulator A15. A second input column may be 14 pixels away from the center and a comparison may result in a partial score of 13 to be added to the corresponding accumulator A14. A third input column may be 13 pixels away from the center and a comparison may result in a partial score of 8 to be added to the corresponding accumulator A13. The partial scores may be accumulated in the shifting register chain 26 and after 31 adds to the accumulators A15 to A-15 and 31 shifts, the final score for the 31×31 circle may be shifted out of A-15.

For easier mathematical description, a possible operation of a system using an accumulator chain having only a first, a second and a third accumulator and processing columns of 3 lines is described: A directional reference gradient reference pattern may be given by $$\begin{bmatrix} a & b & c \\ d & e & f \\ g & h & i \end{bmatrix}$$

and three columns of input gradient direction pixel values may be given by a first column $$\begin{bmatrix} u_0 \\ v_0 \\ w_0 \end{bmatrix},$$

a second column $$\begin{bmatrix} u_1 \\ v_1 \\ w_1 \end{bmatrix},$$

and a third column $$\begin{bmatrix} u_2 \\ v_2 \\ w_2 \end{bmatrix}.$$

For the sake of compact notation, a term such as au may be regarded as an angular comparison operation. If a and u are both valid and are of the same gradient direction, the comparison result au may be 1, otherwise 0. In a first cycle, the first column may be applied to the score network comprising the reference pattern, only the partial scores produced by the first column may be calculated by comparing them to the three columns of the reference pattern. The first accumulator may comprise a first value $au_0+dv_0+gw_0$, the second accumulator may comprise a second value $bu_0+ev_0+hw_0$, and the third accumulator may comprise a third value $au_0+dv_0+gw_0$, and the final score value may be invalid. Then the accumulator chain may be shifted once to the right, the second column may be applied to the score network and the partial score values corresponding to the second column may be added to the first, second and third values of the three accumulators, giving a first accumulator value of $au_1+dv_1+gw_1$, a second accumulator value of $au_0+dv_0+gw_0+bu_1+ev_1+hw_1$, and a third accumulator value $bu_0+ev_0+hw_0+cu_1+fv_1+iw_1$, and an invalid final score. After another shift to the right and during another cycle, the partial score values depending on the third column applied to the score network may be added to the first, second and third values of the three accumulators, giving a first accumulator value of $au_2+dv_2+gw_2$, a second accumulator value of $au_1+dv_1+gw_1+bu_2+ev_2+hw_2$, and a third accumulator value $au_0+dv_0+gw_0+bu_1+ev_1+hw_1+cu_2+fv_2+iw_2$, which may be shifted out of the chain as the first final score, being identical to a result of a calculation intense single score calculation. Additional columns consecutively sent to the score network may result in further valid final scores values.

The maximum search may then for example be efficiently implemented by sorting the list of final scores on the fly each time a newly calculated final score becomes available. Therefore, a big histogram buffer may not be required. Geometric calculations may be avoided, and only a single search pass may be required when processing an input image.

Figure 3:
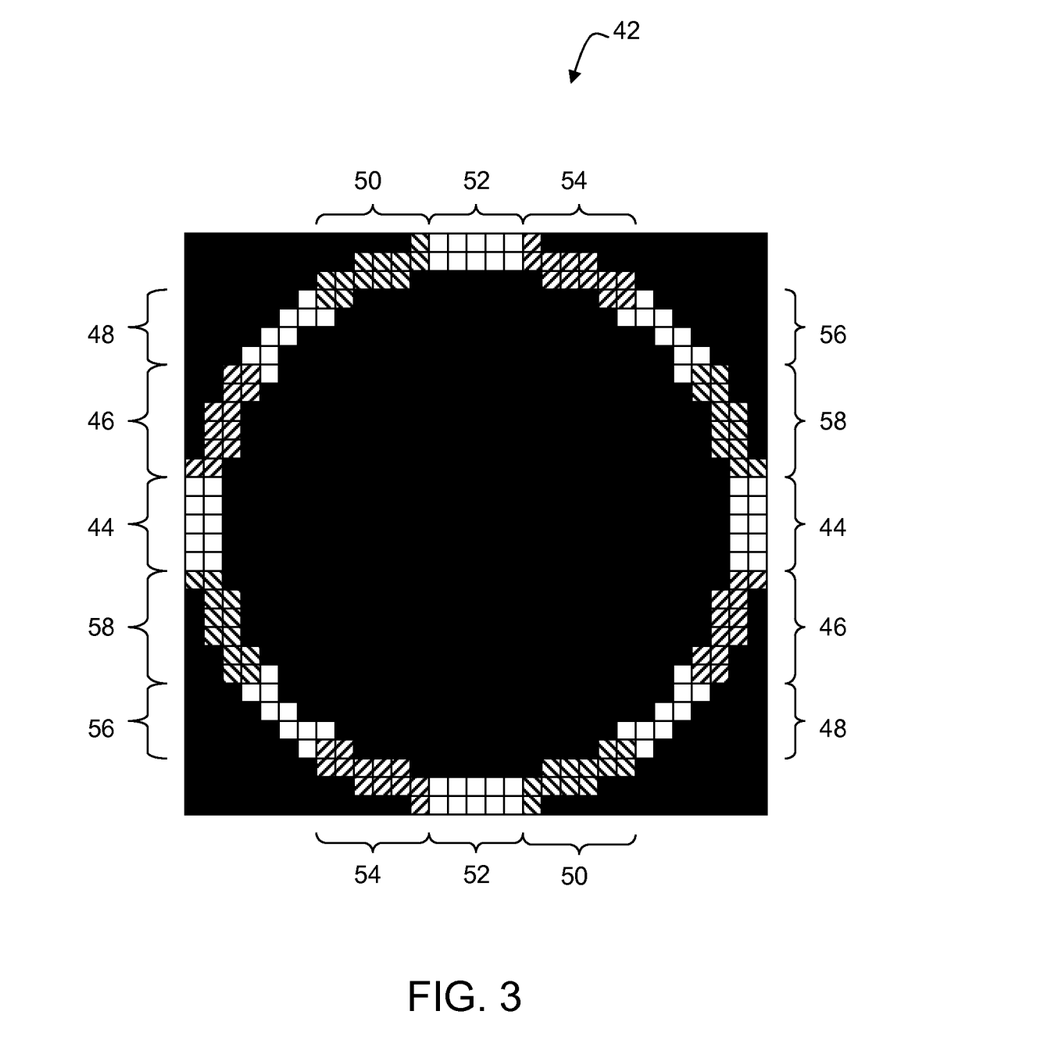
FIG. 3 shows a schematic diagram of an example of a fraction of a directional gradient image.

Still referring to FIG. 2 and now also to FIG. 3, a schematic diagram of an example of a fraction of a directional gradient image 42 is shown. It may also be regarded as an example of a reference directional gradient pattern of a shape. The shape may be a circle having a diameter of n or less pixel values, therefore allowing the system to efficiently calculate the HTFC for circles of the chosen diameter. Each final score may refer to a possible circle center of the position given by the center of the gradient direction pixels used for calculating the final score. The chosen diameter may for example be 31 pixels corresponding to a circle radius of 15 pixels. However, other diameters are possible, such as more than or less than 31 pixels, for example 15 or 7 pixels.

Although the shape in the shown example is a circle of the chosen diameter, it is in the scope of the system to use other shapes, such as an ellipse of a chosen radius combination, circles with different diameters or other shapes with all parameters describing the shape being fix except the horizontal and vertical positions.

To enable efficient comparison of values, the gradient direction pixel values and the reference gradient direction pixel values may be quantized depending on the same quantization characteristic. The gradient direction pixel values may be coarsely quantized. For example, for a circle opposite directions may be added to the same quantization step. For example, a circle having a diameter of 31 pixels may be quantized sufficiently with 3+1 bits, allowing for encoding 8 directions 44, 46, 48, 50, 52, 54, 56, 58 (opposite directions are the same) plus 1 validity bit disclosing, whether or not the gradient is above a detection acceptance threshold. If a gradient is found to be invalid, it is set to 0, shown in FIG. 3 as black gradient direction values.

Figure 4:
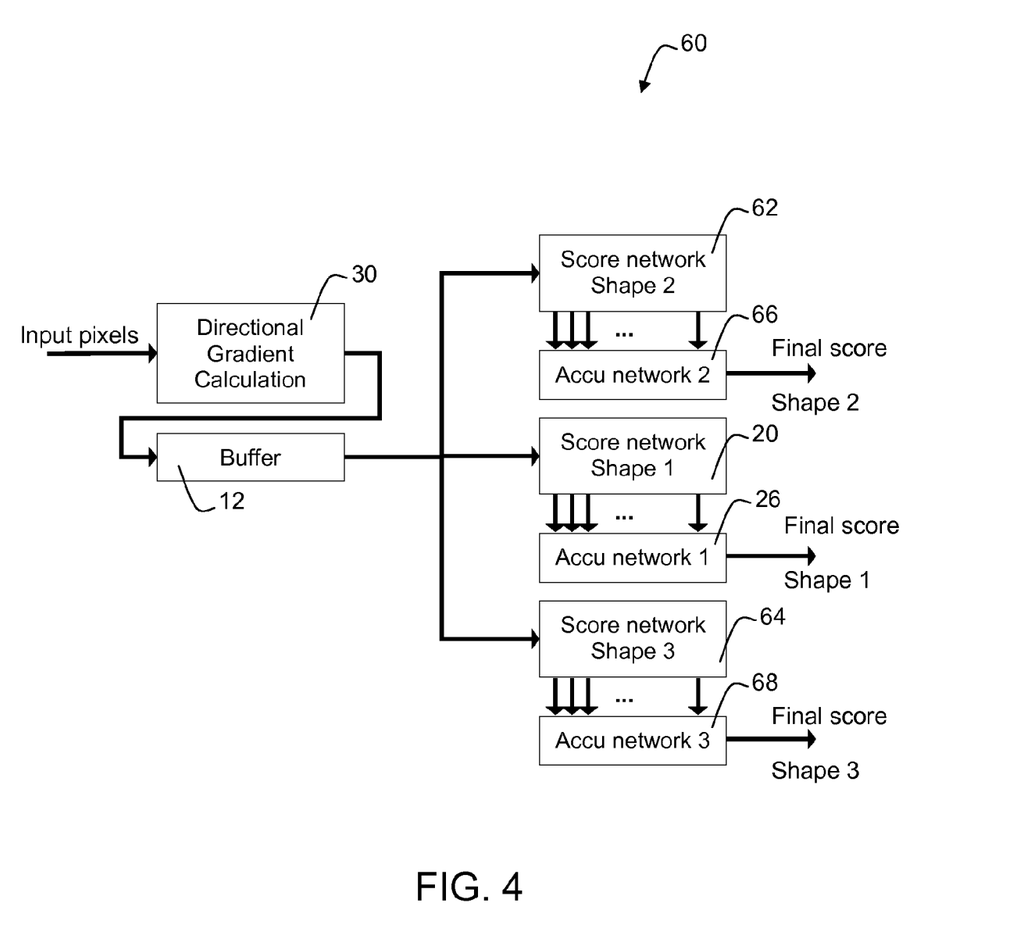
FIG. 4 shows a schematic block diagram of a second embodiment of a system for efficient feature extraction.

Referring now to FIG. 4, a schematic block diagram of a second embodiment of a system for efficient feature extraction is illustrated. Only components differing from those of the shown first embodiment will be described. The system may comprise one or more additional score networks 62, 64. Each additional score network may provide score values corresponding to a different shape and may be coupled to a corresponding additional accumulation network 66, 68.

It should be noted that a different shape may also refer to a similar shape characterized by a different parameter value. For example, circles of different diameters may be considered to be different shapes. Hence, this embodiment of the system may for example provide final score values and therefore histogram entries for a HTFC of an input image for a plurality of diameters concurrently at the same time. This may enable the extraction of circle positions of circles having different diameters from input images at the same time. A processing of the image using concurrent processors may not be required. And only one single buffer 12 may be used for providing the gradient direction pixel values to the plurality of score networks 20, 62, 64. This may reduce the required buffer memory and therefore the required chip space. For example, when calculating an HTFC for eight different circle diameters, the buffer chip space required for storing 8 full histograms may be more than eight times bigger than the chip space required for a ringbuffer 12 according to the described second embodiment of a system 60 for efficient image feature extraction.

Figure 5:
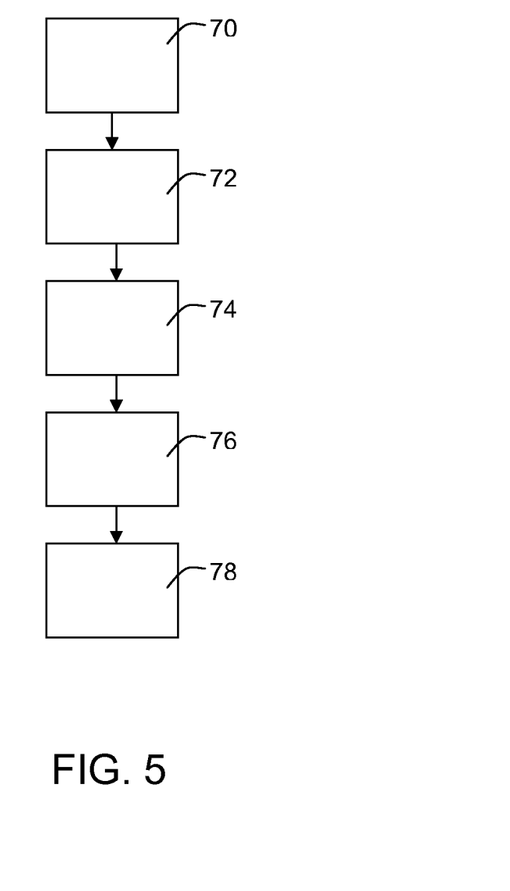
FIG. 5 shows a schematic flow diagram of an example of an embodiment of an image feature extraction method.

Referring now to FIG. 5, a schematic flow diagram of an example of an embodiment of an image feature extraction method is shown. The illustrated method allows implementing the advantages and characteristics of the described system for efficient image feature extraction as part of an image feature extraction method.

The method comprises storing 70 a slice of at least a first plurality n of lines of gradient direction pixel values of a directional gradient image in a buffer; providing 72 a second plurality m of columns of gradient direction pixel values of the slice to a score network input of a score network; comparing 74 the gradient direction pixel values of the second plurality of columns with corresponding reference gradient direction pixel values of a reference directional gradient pattern of a shape; providing 76 partial score values depending on result values of the comparisons; and providing 78 a final score value depending on the partial score values.

The step of providing 76 partial score values may comprise providing each of the partial score values as a result of a comparison of a column of the reference gradient direction pattern and a column of the second plurality m of columns.

And the step 72 of providing a second plurality m of columns of gradient direction pixel values of the slice to a score network input of a score network may then comprise providing each of the second plurality m of columns of the slice to the score network consecutively; and applying each column of the second plurality m of columns in parallel to each of a plurality of column comparator networks.

Although the system may be implemented or the method may be executed using any kind of suitable hardware and/or software, for many applications it may be desired to have it integrated in a system-on-a-chip, comprising a system for efficient image feature extraction or implementing a method as described above.

Many applications employing image processing may use an image feature extraction system or a method as described above. When using it for HTFC, it may for example be used in applications for eye pupil detection, video surveillance systems or for the detection of traffic signs. The system may for example be used in advanced driver assistance systems (ADAS). ADAS may be In-vehicle navigation systems. Video-based ADAS such as adaptive cruise control (ACC), lane departure detection/warning systems, lane change assistance, intelligent speed adaptation or intelligent speed advice (ISA), night vision systems, pedestrian protection systems, or driver drowsiness detection systems may for example use traffic sign detection based on circle detection. However other shapes may be extracted and evaluated as well. Therefore, an advanced driver assistance system (ADAS) may comprise a system-on-a-chip or a system for efficient image feature extraction or may implement a method as described above.

Figure 6:
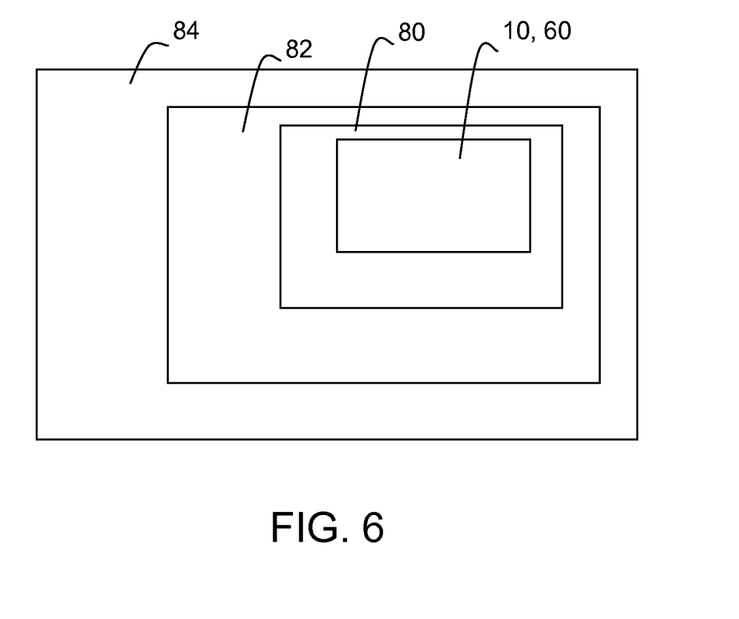
FIG. 6 shows a schematic diagram of an example of an embodiment of a vehicle.

Referring now also to FIG. 6, a schematic diagram of an example of a vehicle 84 is shown. The vehicle 84 comprises an advanced driver assistance system 82 using a system-on-a-chip 80 having a system 10, 60 for efficient image feature extraction. It is an example for a vehicle that may comprise a system-on-a-chip or an advanced driver assistance system or a system for efficient image feature extraction as described above. A vehicle 84 may be a car. However, it may be any other vehicle such as a truck, a motor bike, a train, a ship, a helicopter, a plane, or a bicycle.

The system may be implemented or the method may be executed using hardware components. However, a computer program product may comprise code portions for executing steps of a method or for implementing parts of an image feature extraction system as described above when run on a programmable apparatus.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Also, at least portions of the system 10, 60 may be implemented using a programmable logic device (PLD), e.g. a field programmable gate array (FPGA), an application specific integrated circuit (ASIC) etc., or as a program code executable by a processing device, such as a digital signal processor (DSP), a microcontroller unit (MCU), a general purpose processor (GPP), a central processing unit (CPU), a graphics processing unit (GPU), etc.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of systems. For example, although FIG. 1 and the discussion thereof describe an exemplary feature extraction system, this exemplary system is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other.

Also for example, system 10 or portions thereof may be soft or code representations of physical circuitry or of logical representations convertible into physical circuitry. As such, system 10 may be embodied in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. A system for efficient image feature extraction, comprising
   a buffer for storing a slice of at least a first plurality n of lines of gradient direction pixel values of a directional gradient image, said buffer having
      a buffer input for receiving said first plurality n of lines and
      a buffer output for providing a second plurality m of columns of gradient direction pixel values of said slice to a score network input of a score network, said score network comprising:
   a plurality of comparators for comparing said gradient direction pixel values of said second plurality m of columns with corresponding reference gradient direction pixel values of a reference directional gradient pattern of a shape; and
   a plurality of adders for providing partial score values depending on output values of said comparators to one or more score network outputs, said one or more score network outputs coupled to one or more corresponding accumulation network inputs of
   an accumulation network having
      an accumulation network output for providing a final score value depending on said partial score values.

2. The system as claimed in claim 1, wherein said buffer is a ring buffer.

3. The system as claimed in claim 1, wherein said buffer allows for storing at least one additional line of gradient direction pixel values.

4. The system as claimed in claim 1, comprising
   a gradient direction calculation module having
      a module input for receiving input pixels of an input image and
      a module output for providing said gradient direction pixel values of said directional gradient image calculated from said input image to said buffer input.

5. The system as claimed in claim 1, wherein said comparators and adders are coupled to form a plurality of column comparator networks, each column comparator network providing one of said partial scores to said accumulation network.

6. The system as claimed in claim 5, wherein said second plurality m of columns of said slice is applied to said score network consecutively and each column of said second plurality m of columns is applied in parallel to each of said column comparator networks.

7. The system as claimed in claim 6, wherein said accumulation network comprises a plurality of accumulate-and-shift registers coupled to form an accumulator chain.

8. The system as claimed in claim 7, wherein;
   a second column b of the second plurality of m columns is applied to said score network after a first column a of the second plurality of m columns is applied to said score network;
   a partial score provided by a column comparator network of the plurality of column comparator networks in the application of column a to said score network is a result $C_a$ of a comparison of gradient direction pixel values of column a with corresponding reference gradient direction pixel values of the reference directional gradient pattern;
   each of said accumulate-and-shift registers is coupled to a different column comparator network for receiving one of said partial score values;

the accumulate-and-shift registers are for shifting the result $C_a$ to another column comparator network of the plurality of column comparator networks; and a partial score provided by the other column comparator network of the plurality of column comparator networks in the cation of column b to said score network is the sum $C_a+C_b$, wherein $C_b$ is a result of a comparison of gradient direction pixel values of column b with corresponding reference gradient direction pixel values of the reference directional gradient pattern.

9. The system as claimed in claim 1, wherein said shape is a circle having a diameter of n or less pixel values.

10. The system of claim 9, wherein the system does not include a storage area comprising storage for a 2-dimensional set of values of circle-center probability scores.

11. The system as claimed in claim 1, wherein said gradient direction pixel values and said reference gradient direction pixel values are quantized depending on the same quantization characteristic.

12. The system as claimed in claim 1, further comprising:
one or more additional score networks, each additional score network for providing score values corresponding to a different shape, coupled to a corresponding additional accumulation network.

13. An image feature extraction method, comprising:
storing a slice of at least a first plurality n of lines of gradient direction pixel values of a directional gradient image in a buffer of a computing device;
providing by the computing device a second plurality m of columns of gradient direction pixel values of said slice to a score network input of a score network;
comparing said gradient direction pixel values of said second plurality m of columns with corresponding reference gradient direction pixel values of a reference directional gradient pattern of a shape;
providing partial score values depending on result values of said comparisons; and
providing a final score value depending on said partial score values.

14. The image feature extraction method as claimed in claim 13, wherein:
the step of providing partial score values comprises providing each of said partial score values as a result of a comparison of a column of said reference gradient direction pattern and a column of said second plurality m of columns; and
the step of providing the second plurality m of columns of gradient direction pixel values of said slice to a score network input of a score network comprises:
providing each of said second plurality m of columns of said slice to said score network consecutively, and
applying each column of said second plurality m of columns in parallel to each of a plurality of column comparator networks, each application of a column to a column comparator network providing a partial score value of the partial score values, wherein each application represents a different center position of the shape.

15. A computer program product, comprising a computer-readable medium containing code portions for executing steps of a method as claimed in claim 13.

16. A system-on-a-chip, comprising
a buffer for storing a slice of at least a first plurality n of lines of gradient direction pixel values of a directional gradient image, said buffer having
a buffer input for receiving said first plurality n of lines and
a buffer output for providing a second plurality m of columns of gradient direction pixel values of said slice to a score network input of a score network, said score network comprising:
a plurality of comparators for comparing said gradient direction pixel values of said second plurality m of columns with corresponding reference gradient direction pixel values of a reference directional gradient pattern of a shape; and
a plurality of adders for providing partial score values depending on output values of said comparators to one or more score network outputs, said one or more score network outputs coupled to one or more corresponding accumulation network inputs of
an accumulation network having
an accumulation network output for providing a final score value depending on said partial score values.

17. An advanced driver assistance system (ADAS), comprising
a system-on-a-chip as claimed in claim 16.

18. A vehicle, comprising
a system-on-a-chip as claimed in claim 16.

19. The system of claim 1 wherein:
each of the second plurality m of columns of the buffer output includes n elements;
the reference gradient direction pixel values comprise an array with m columns, each column including n elements;
a gradient direction pixel value $B_{i,j}$ of the second plurality m of columns of the buffer output corresponds to a gradient direction pixel value $REF_{i,j}$ of the reference gradient direction pixel values, where $B_{i,j}$ is a gradient direction pixel value of an ith element of a jth column of the m columns of the output buffer and $REF_{i,j}$ is a gradient direction pixel value of an ith element of a jth column of the m columns of the reference gradient direction pixel values; and
the final score value is determined by the formula:

$$\text{Final Score Value} = \sum_{\substack{i=i,n \\ j=1,m}} REF_{i,j} X B_{i,j}$$

where the operator X denotes a comparison between gradient direction pixel values.

20. The system of claim 19, wherein the comparison X between gradient direction pixel values $PV_1$ and $PV_2$ is defined as follows:
$PV1 \times PV2=1$, if PV1 and PV2 are both valid and are both of the same gradient direction; and
0, otherwise.

* * * * *